R. J. FISHER.

TYPE WRITING MACHINE.

APPLICATION FILED FEB. 5, 1904.

Reissued Aug. 25, 1914.

13,790.

2 SHEETS—SHEET 1.

Robert J. Fisher,
Inventor

By E. G. Siggers
Attorney

Witnesses
Jas. E. McCathran
Geo. G. Julihn

R. J. FISHER.

TYPE WRITING MACHINE.

APPLICATION FILED FEB. 5, 1904.

Reissued Aug. 25, 1914.

13,790.

2 SHEETS—SHEET 2.

Robert J. Fisher, Inventor

By E. G. Siggers

Attorney

Witnesses

Jas. E. McCathran

Louis G. Julian

UNITED STATES PATENT OFFICE.

ROBERT JOSEPH FISHER, OF ATHENS, TENNESSEE, ASSIGNOR, BY MESNE ASSIGNMENTS, TO ELLIOTT-FISHER COMPANY, A CORPORATION OF DELAWARE.

TYPE-WRITING MACHINE.

13,790. Specification of Reissued Letters Patent. Reissued Aug. 25, 1914.

Original No. 708,213, dated September 2, 1902, Serial No. 28,419. Application for reissue filed February 5, 1904. Serial No. 192,246.

*To all whom it may concern:*

Be it known that I, ROBERT JOSEPH FISHER, a citizen of the United States, and a resident of Athens, county of McMinn, and State of Tennessee, have invented a new and useful Type-Writing Machine, of which the following is a full, clear, and exact description.

This invention relates to typewriting machines, and has special reference to printing mechanism employing type-heads each carrying a plurality of type whose printing faces are disposed at an angle to each other.

The primary object of the present invention is to effect an improvement in the means for controlling a shiftable type-head carrying an upper and a lower case character.

To this end the invention contemplates the provision of suitable mechanical means in operative relation to a shiftable or pivotal type-carrying head to provide for the positive shifting or turning thereof to either of its operative positions and holding the same rigid in such positions to insure a true impression of the type in proper alinement.

In a more restricted aspect, the invention has in view the provision of combined shifting and locking means carried by the type-bar and having an operative connection with the shiftable type-head to provide for positively turning it upon its axis to effect the shifting movement thereof, while also providing for locking or securing it in the shifted position.

With these and many other objects in view, which will readily appear to those familiar with the art as the nature of the invention is better understood, the same consists in the novel combination and relation of parts hereinafter more fully described, illustrated, and claimed.

The essential feature of the invention resides in suitable means carried by the type-bar for positively turning the type head upon its axis in either direction, according as upper or lower case characters are to be printed, and various forms of mechanical expedients may be resorted to for accomplishing this result; but one of the preferable embodiments of the invention is shown in the accompanying drawings, in which—

Figure 1:
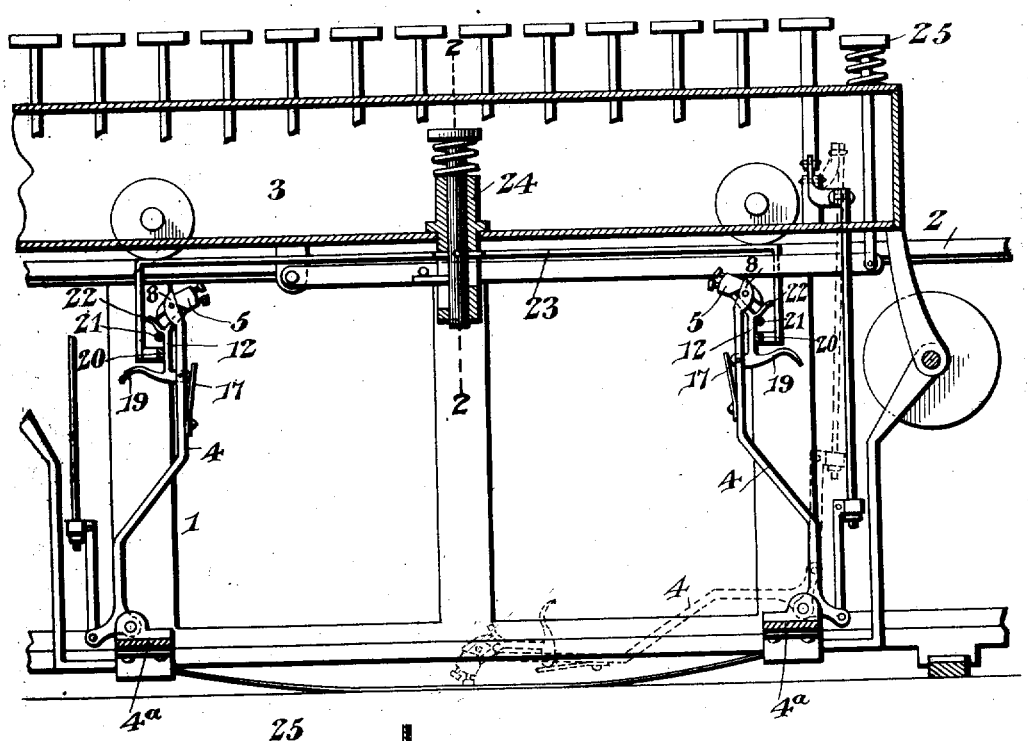
Figure 2:
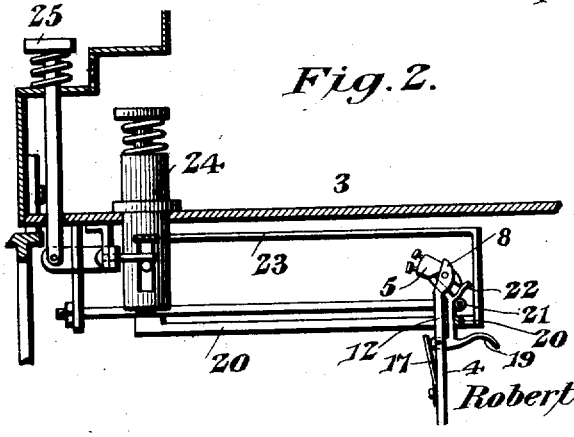
Figure 3:
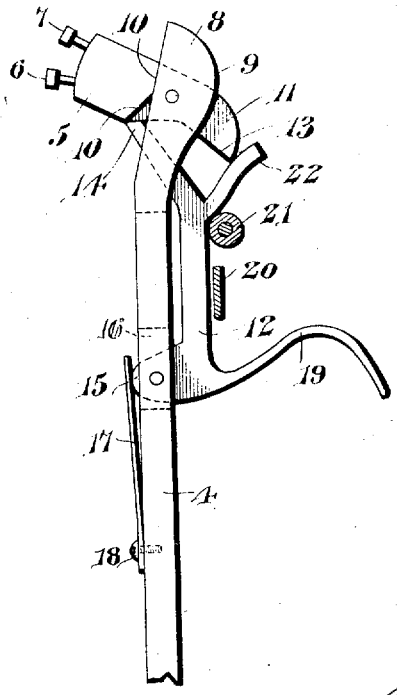
Figure 4:
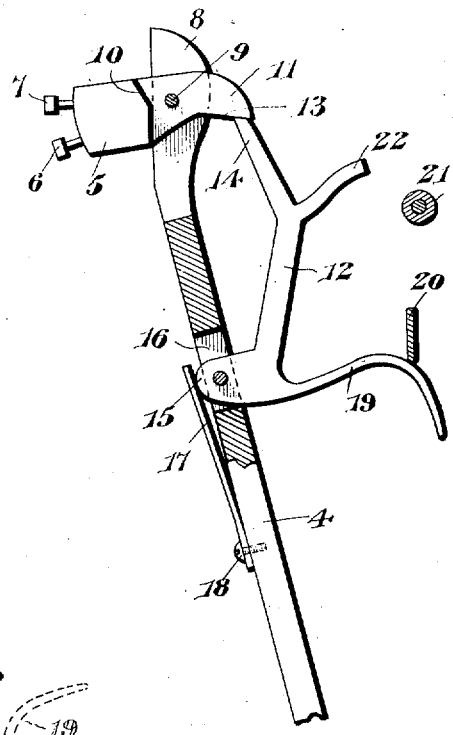
Figure 5:
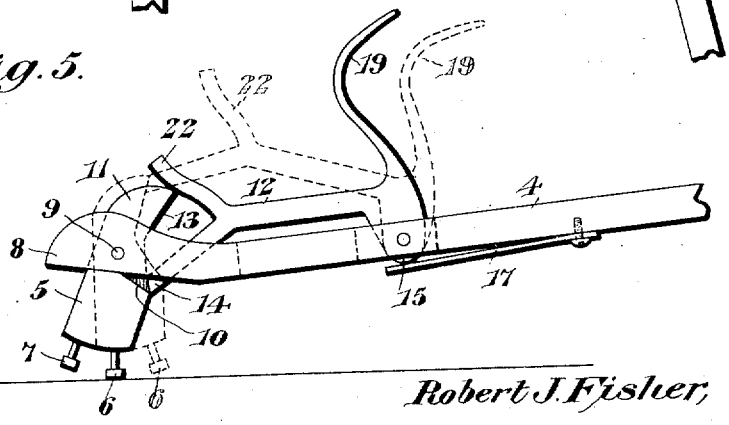

Figure 1 is a vertical sectional view of a portion of a typewriting machine employing type bars equipped with the improvement contemplated by the present invention. Fig. 2 is a detail sectional view on the line 2—2 of Fig. 1, showing more plainly one arrangement of the trip and buffer associated with the type bars to effect the necessary adjustment of the shifting and locking device for each shiftable type head. Fig. 3 is an enlarged detail elevation of a portion of a swinging type bar equipped with the improvements contemplated by the present invention, showing the movable type head and the trigger which constitutes the shifting and locking device in their normal positions. Fig. 4 is a similar view showing the relation of the trip and the other parts when a capital or upper case character is to be printed. Fig. 5 is a sectional view of the swinging end of a type bar thrown to the printing position and illustrating the movable type head and trigger associated therewith in both of their adjusted positions, the different positions being illustrated respectively by full and dotted lines.

Like numerals of reference designate corresponding parts in the several figures of the drawings.

The present invention is necessarily applicable to the printing mechanism of any form of type-writing machines employing type bars; but for illustrative purposes, there is shown in the drawings a portion of that type of machine known as the "Fisher" typewriter and a form of which is disclosed in my former Patent No. 569,626, issued October 20, 1896. This typewriting machine embodies as a part thereof a main frame 1, having a carriage guide 2, upon which is arranged for movement the traveling carriage 3, carrying the key-action, having operative connection with the swinging or pivotal type bars 4, which are mounted in hangers arranged upon the supporting ring $4^a$, fitted within the frame of the machine. These are ordinary features of the Fisher typewriting machine and are not claimed herein, as the improvement forming the subject-matter of the present invention relates solely to the movable or shifting type head carried by each type bar 4 and the coöperating elements directly associated therewith.

The type bars 4, shown in the drawings, are of the swinging or pivotal type, and in carrying out the present invention, each of the type bars 4 carries a movable or shiftable type head 5, which has fitted thereto in any approved way now practised a pair of type 6 and 7, whose printing faces are disposed at an angle to each other and respectively bear lower and upper case characters. The said movable or shiftable type-carrying head 5 is designed to be shiftable to either of two positions for the printing of upper or lower case characters and in the preferable construction is mounted to turn within the terminal bifurcation 8, formed in the free swinging end of a type bar, said type-carrying head 5 being supported in place by a suitable pivot 9 passing therethrough and also through the side cheeks of the bifurcation 8 to provide a pivotal support, which constitutes the axis upon which the head 5 turns in shifting from one position to the other. Any other suitable means of pivotally or movably supporting the type-carrying head upon the type bar may be resorted to without affecting the result sought to be accomplished. By reason of being pivotally mounted within the bifurcation 8 of the type bar, the type-carrying head is held and braced more firmly to a proper working position and in the preferable construction is provided upon opposite sides thereof with inclined shoulder portions 10, adapted to engage against the contiguous edges of the cheeks of the bifurcations 8 to provide simple and effective means for positively limiting the movement of the said type-carrying head in opposite directions, and at this point it may be observed that the preponderance of weight or the center of gravity of the type-carrying head is in advance of the pivotal point or axis 9, or, in other words, is located at one side of the type bar so that the normal tendency of the portion of the type head carrying the type 6 and 7 is to drop to its lower position when the type bar is at rest and to swing outward under centrifugal force when the type bar is swung toward the printing plane; but this normal tendency of the type-carrying head to move under the influence of gravity and centrifugal force is counteracted through the medium of the shifting and locking means for the type-carrying head, which will be hereinafter more fully described. The shiftable or movable type-carrying head 5 of each type bar preferably has the lower case character innermost on account of the normal position in which the type-carrying head is preferably held, and in the carrying out of the present invention, the type-carrying head 5 has projected beyond one side of its pivotal point or axis 9, a cam-ear 11, working within the bifurcation 8 and projecting beyond the side of the type bar opposite the portion of the head carrying the type. In the construction shown in the drawings, the cam-ear is of an approximately semicrescent shape; but the active portion of this cam-ear really resides in that portion which coöperates directly with the trigger 12, which portion is at the inner edge of the ear 11, and consists in providing such portion of the ear 11 with an arcuate bearing face 13, against which plays the terminal shifter-finger 14 of the trigger 12. The shifter-fingers 14, in the practical construction of the device, may be a separate or integral part of the trigger, but, as shown in the drawings, simply consists of the free end thereof, which is deflected laterally from the main stem or portion of the trigger, so as to reach into the bifurcation 8 beneath the head 5 and coöperate directly with the arcuate bearing face 13 of the said cam-ear 11.

The trigger 12 is supported by and carried with the type bar, and this trigger in the present invention not only constitutes a locking member or device for holding the type-carrying head rigid in its set or adjusted position, but also acts in the capacity of a mechanical shifter to provide positive mechanical means for turning the type-carrying head upon its axis in contradistinction to relying upon centrifugal force, gravity or equivalent non-mechanical means. The said trigger 12 is arranged, preferably, alongside of the type bar contiguous to the swinging end thereof and at the rear of such type bar or without the path of the type bar, so as to coöperate with the trip and buffer elements hereinafter described. A preferable manner of supporting the trigger in active position is to provide the same at one end with a rounded hub or heel 15, pivotally mounted in the slot 16, formed in the type bar at an intermediate point, and projecting through said slot, said hub or heel being adapted to be permanently engaged by the free end of a friction or brake spring 17, secured fast, as at 18, to the stem or body of the type bar. At this point it is to be further observed that the slot 16, within which the hub end of the trigger is pivotally mounted, is restricted in its length sufficiently so as to act in the capacity of a stop to limit the movement of the trigger, so as to obviate the tendency of the same to swing away from the type bar and become disengaged from the cam element of the type carrying head 5.

While the trigger 12 serves as an actuator for shifting the head toward the axis of the type bar during the first part of the printing stroke, and resists the re-shifting of the head in the opposite direction, it is assisted in the performance of this latter function by means coacting with the actuator and retaining or tending to retain said actuator in its effective position, that is to say, in position to resist the re-shifting of the head. The brake spring 17 and the stop formed by the lower end of the slot, constitute one embodiment of such means, although it is obvious that either of these elements or any other construction which would retain or tend to retain the actuator in position to resist re-shifting of the type head would answer the purpose described. In fact, while it is perhaps preferable to employ means coacting with the actuator to retain the same, for the purpose described, it will perhaps be possible in the construction shown to omit both the stop and the spring and to rely wholly upon the peculiar relation of the head and trigger to retain these parts in their proper positions.

In addition to the features described, the trigger 12 is also preferably provided at the pivoted end thereof with a rearwardly extending cam-tail 19, with which is designed to coöperate a movable key-actuated trip 20, which is permanently located outside of the path of the said cam-tail 19 of the trigger 12 and in rear thereof when in the normally upright position, but shiftable to and away from a position for interference with the upstanding bend of the cam-tail 19. The said trigger is designed to also coöperate with a fixed trip member, which for convenience in distinguishing it from the movable member 20 is termed a "buffer" 21, and this buffer 21 is also permanently located in a position outside of the path of the type bar, in rear thereof, but is designed to coöperate with the laterally offset resetting arm 22, which is projected from the trigger 12 at an intermediate point and contiguous to the shifter element or finger 14, which coöperates with the cam element 11 of the type-carrying head. The said resetting arm 22 is suitably bent or inclined, so as to properly engage or ride upon the fixed trip or buffer 21 when the latter is designed to come into play; but it will of course be understood that it is only necessary to preserve a proper working relation between these elements to secure the necessary operation.

In carrying out the present invention it is unimportant how the trips 20 and 21 are supported in position within the machine, and it is also equally unimportant what particular key-actuated means are employed for adjusting or moving the trip 20; but these features of the invention are preferably similar to the corresponding features disclosed in my reissue Patent No. 11,848, issued August 21, 1900. As shown in the aforesaid patent and in the drawings of the present case, the movable trip 20 is usually in the form of a semi-ring and is yieldingly sustained in an inoperative non-interfering position with reference to the cam portions or trip arms 19 of the triggers of the several type bars, it of course being understood that the trip 20 is designed to extend around all of the type bars of the type basket and wholly outside of the path of movement thereof.

In the construction shown, the trip 20 is vertically movable and is carried by a spider frame 23, which is yieldingly sustained in an elevated position by a spring supporting device 24, which is designed to be depressed to lower the trip 20 through the medium of a "case-key" 25, having operative connection with the said supporting device; but these features are only shown for illustrative purposes and constitute no part of the present invention. With reference to the buffer 21, the same is also in the form of a semi-ring and may consist of a wire rod or equivalent permanently connected with the carriage from which the type-action is suspended, as shown in Fig. 2 of the drawings, to maintain substantially the same normal non-interfering relation to the triggers of the several type bars as the movable trip 20, already referred to.

In the normal position of the parts, the shifter element or finger 14, or, in other words, the free end of the trigger 12, (which constitutes a complete shifting and locking device,) lies within the bifurcation 8 and in engagement with the type-carrying head 5 at one end of the arcuate bearing face 13 thereof. In this position the trigger 12 acts as a positive lock for holding the type head rigid in its outturned position, with the lower case character 6 thereof in proper position for printing. This is the normal position, and the parts remain in the relation specified as long as lower case characters are being printed. It will be observed that the tendency of the type-carrying head 5 as the type-bar swings upon its axis toward the printing plane is to remain in the position shown in Fig. 3 of the drawings. This is due to the centrifugal force which exerts itself as the type bar is thrown to the writing plane, so that the centrifugal tendency of the type-carrying head to move outward, together with the positive engagement of the trigger therewith, serves to hold the type-carrying head securely locked in position for printing lower case characters. At this point it may also be observed that the inertia or tendency of the trigger to be drawn backward from the type bar just as the latter suddenly leaves the buffer-ring 21 is obviated by the frictional engagement or pressure of the brake-spring 17 upon the hub or heel end 15 of the trigger. It should also be observed that upon the impact of the type with the work the tendency of the trigger is to move toward the type bar, or, in other words, to keep its normal or lower case position, which is shown in Fig. 3 of the drawings.

Now when it is desired to print upper case characters, the movable trip 20 is depressed by the key-actuated means therefor, so as to carry its lower edge into an interfering position with relation to the upstanding head of the cam-tail 19 of the trigger, and as the type bar swings forwardly toward the writing plane, the said cam-tail of the trigger drags beneath the depressed trip 20, thus oscillating the trigger upon its pivot or axis and moving the free end thereof along the arcuate bearing face 13 of the cam ear or element 11, thus positively transmitting a shifting movement to the type-carrying head 5 and causing it to oscillate upon its axis or pivot 9 to bring the upper case character 7 into printing position. In the printing of capitals the inertia of the trigger will tend to move the same out of engagement with the type-carrying head as the type bar leaves its normal position; but this is obviated by the limited movement of the hub or heel of the trigger in the slot 16 of the type bar, thus positively holding the trigger in operative relation by preventing it from coming entirely out from behind the cam element of the type-carrying head. In the printing of capitals the free end or shifter element of the trigger therefore remains in engagement with the type head and prevents centrifugal force, upon the movement of the type bar from the printing plane, from throwing the type head outwardly, and thus causing the printing of a lower case character. After printing an upper case character or capital letter upon the return of the type bar to its normal position, the resetting arm 22 of the trigger engages with the buffer 21, thereby forcing the trigger into its normal position into the bifurcation of the type bar and at the same time positively oscillating or turning the type head upon its axis to cause it to assume its normal position for printing lower case characters. When printing upper case or capital letters continuously, the trigger necessarily moves back and forth into and out of its two positions each time an upper case character is printed: but this does not affect the accurate and positive relation of the parts.

Attention is again directed to the fact that the typehead is positively locked in both its normal and shifted positions. In the normal position of the typehead, shown in Fig. 3, its movement in an upward direction is prevented by the engagement of the upper shoulder 10 with the type bar, while movement of the head in an opposite or downward direction is prevented by the finger 14, which engages the head in advance of the pivot 9 in a manner to cause the line of strain to substantially intersect the axis of the trigger 12. In the shifted position of the typehead, shown in Fig. 4, its downward movement is prevented by the engagement of the lower shoulder 10 with the type bar, and upward movement of the head is resisted by the finger 14 engaging the cam ear 11 in a manner to cause the line of strain to either intersect the axis of the trigger or to fall in rear thereof, the engagement of the trigger with the lower wall of the slot 16 preventing said trigger from moving farther back than the position shown in Fig. 4.

Attention may also be directed to the fact that this invention is not limited to the shifting and positive locking of the head. On the contrary, it is believed to be novel to shift a plural typehead during the early part of the movement of the head toward the printing point and to provide means for preventing the reshifting of the head back to its normal position, regardless of whether the head is locked against movement in both directions or not.

In this application no claim is made to the subject-matter claimed in the copending application of John A. Smith, No. 108,522, filed May 22, 1902.

The essential features of the invention have been particularly pointed out in connection with one embodiment thereof; but it will of course be understood that various mechanical expedients may be resorted to for securing the desired positive shifting of the type head, and therefore various changes in the form, proportion, and minor details of construction may be resorted to without departing from the principle or sacrificing any of the advantages of this invention.

Having thus described the invention, what is claimed as new, and desired to be secured by Letters Patent, is—

1. In a typewriting machine, the combination with the type bar, of a pivotal type head carried by the type bar and having a cam ear formed with an arcuate bearing face, a trigger carried by the type bar and having a shifter element coöperating with said bearing face, and means for actuating said trigger.

2. In a typewriting machine, the combination with the type bar, and the type head pivoted thereto, of a device carried by the type bar for shifting the type head to either of two positions by engaging with said head at opposite sides of its pivotal point.

3. In a typewriting machine, the combination with the type bar, and the type head pivoted thereto, of a device carried by the type bar for shifting the type head to either of two positions and locking the same in each position, said operations being effected by direct engagement with the head at opposite sides of its pivotal point.

4. In a typewriting machine, the combination with the type bar, the type head pivoted thereto, and means for limiting the swinging movement of the type head beyond either of two positions, of a device carried by the type bar for positively shifting the head to and locking the same in either position.

5. In a typewriting machine, the combination with the type bar, and the type head pivoted thereto, of a device carried by the type bar directly engaging with the type head for shifting the same to and locking said type-head in either of two positions, and means for limiting the movement of said device so as to hold it in engagement.

6. In a typewriting machine, the combination with the type bar, and the shiftable type head, of a device carried by the type bar to shift the type head to either of two positions and to lock the same, and separate trips arranged at all times outside of the path of the type head and adapted to be brought alternately in contact with the device to cause the shifting of the type head to one position and to restore said head to its normal position.

7. In a typewriting machine, the combination with the type bar, and the pivoted type head carried thereby and provided with a portion projecting beyond the pivotal point, of a device carried by the type bar and having a shifting finger engaging with the type head and adapted to be transferred to opposite sides of the pivot of the head to shift the same into either of two positions.

8. In a typewriting machine, the combination with the type bar, and the pivoted type head carried thereby and provided with a portion projecting beyond the pivotal point, of a device carried by the type bar and having a shifting finger engaging with the type head and adapted to be transferred to opposite sides of the pivot of the head to shift the same into either of two positions, a resetting arm and a tripping tail carried by the device, and a double trip engaging with the tripping tail and the resetting arm.

9. In a typewriting machine, the combination with the type bar, and a movable type head mounted thereon and adapted to be shifted to either of two positions, of a single device carried by the type bar and engaging with the type head for positively shifting the head to and locking the same in each position.

10. In a typewriting machine, the combination with the type bar, and a movable type head mounted thereon and adapted to be shifted to either of two positions, of a single spring-actuated device carried by the type bar and engaging with the type head for positively shifting the head to and locking the same in each position.

11. In a typewriting machine the combination with the type bar, and a type head pivoted thereto, of a device mounted on the type bar, independent of the type head, but adapted to engage the same to shift it to either of two operative positions and also lock the same in each position.

12. In a typewriting machine, the combination with the type bar, and a type head pivoted thereto, of a device pivoted on the type bar, independent of the type head, but adapted to engage the same to shift it to either of two operative positions and also lock the same in each position.

13. The combination with the type bar, and the type head pivoted thereto, of a single device pivoted on the type bar, independent of the type head, but adapted to engage the same to shift the type head to either of two positions and serve as a lock for the said head in each position, and a spring acting against the said device for the purposes described.

14. The combination with the type bar, and the shiftable type head pivoted thereto, of a single device carried by the type bar, independent of the type head, and constituting a combined shifting and locking means for the type head, to shift the latter to either of two positions and lock the same in each position and a spring for the said device.

15. In a typewriter, a plural type head movable toward and from the printing point and also shiftable to present different type in the printing position, and mechanism cooperating with the head to shift same during the printing stroke but before the final portion thereof, and to hold said head locked during the remainder of the stroke.

16. In a typewriter, a plural type head movable toward and from the printing point and also shiftable to present different type in the printing position, and mechanism coöperating with the head to shift and lock the same during the first part of the printing stroke.

17. In a typewriter, a plural type head movable toward and from the printing point and also shiftable to present different type in the printing position, a head shifting device operating prior to the completion of the printing stroke to completely shift the head from one printing position to another, and means including the shifting device for locking the head when so shifted, and for holding the same locked during the remainder of the printing stroke.

18. In a typewriter, a type bar movable toward and from the printing point, a plural type head shiftable on the bar to present different type in the printing position, and a device separately mounted on the bar for shifting the head during the printing stroke of the type bar, said shifting device and the type bar coöperating to lock the head when shifted.

19. In a typewriter, a type bar movable toward and from the printing point, a plural type head pivoted on the bar and shiftable to present different type in the printing position, and means including an actuator carried by the bar for effecting the shifting and locking of the type head during the printing stroke of the type bar.

20. In a typewriter, a type head movable toward and from the printing point and shiftable to present different type in the printing position, and mechanism whereby the head will be completely shifted from one printing position to another and locked prior to the completion of printing stroke and subsequently unlocked.

21. In a typewriter, a type head movable toward and from the printing point and also shiftable to present different type in the printing position, head shifting and locking means arranged to begin its operation substantially at the commencement of the printing stroke of the type head and including an actuator, and means for moving the actuator to unlock the head.

22. In a typewriter, a type head, and mechanism for performing the following functions, to-wit: the movement of the type head toward and from the printing point, the shifting of the head to present different type in the printing position, the locking of the type head when so shifted, and the unlocking of the head during the return thereof from the printing point, said mechanism including a type bar and an actuator mounted thereon separate from the type head.

23. In a typewriter, a type bar, a pivoted plural type head thereon, means including an actuator for moving the type head on its pivot and for locking the same during the first part of the printing stroke of the bar, and means for unlocking the head.

24. In a typewriter, a type bar movable toward and from the printing point, a type head pivoted thereon and shiftable to present different type in the printing position, means for shifting and locking the type head during the early part of the printing stroke of the type bar, said means including an actuator, and means for moving the actuator to unlock the head.

25. In a typewriter, a type head, and mechanism for performing the following functions, to-wit: the movement of the type head toward the printing point, the shifting of the type head during the first part of such movement to present a different type in the printing position and the locking of the type head in its shifted position, said mechanism including a type arm and an actuator carried thereby, and means for unlocking the type head after the printing of the character.

26. In a typewriter, a type bar movable toward and from the printing point, a type head carried by the bar and shiftable to present different type in the printing position, and mechanism carried in part by the type bar for performing the following functions, to-wit: the shifting of the type head during the first part of the printing stroke, the locking of the head in its shifted position, and the unlocking of the head during the last part of the return stroke of the type bar.

27. In a typewriter, a type bar movable toward and from the printing point, a plural type head mounted on the bar and shiftable to present different type in the printing position, an actuator mounted on the type bar independently of the type head, and means for moving the actuator, the several recited elements coöperating to shift and lock the type head during the printing stroke of the type bar and to unlock the head and reshift the same to its normal position upon the return of the type bar from the printing stroke.

28. In a typewriter, a type head, and mechanism for performing the following functions, to-wit: the movement of the type head to the printing point, the shifting of the type head during the first part of such movement to present a different type in the printing position, the locking of the type head in its shifted position, the return of the type head from the printing point, and the unlocking of the head and the reshifting thereof to its normal position during the last portion of its return movement.

29. In a typewriter, a type head movable toward and from the printing point and shiftable to present different type in the printing position, a projection extended from the head, and mechanism mounted on the type bar and including a part directly coöperating with said projection to shift and lock the head during the printing stroke and movable to unlock the head as the latter returns to its normal position.

30. In a typewriter, a type bar movable toward and from the printing point, a plural type head mounted on the bar and shiftable to present different type in the printing position, and mechanism for shifting and locking the type head during the first part of the printing stroke of the type bar, said mechanism including an element removed from but adjacent to the type bar.

31. In a typewriter, a type bar, a shiftable type head thereon, mechanism carried in part by the type bar for shifting and locking the type head during the first part of the printing stroke of the bar and for unlocking the head and reshifting the same to its normal position upon the return of the type bar from the printing stroke, said mechanism including a trip and a buffer mounted independently of the type bar.

32. In a typewriter, a type bar, a plural type head shiftably mounted thereon, and coöperating devices mounted on the type bar and independently thereof, respectively, for effecting the shifting of the type head and the locking thereof during the first part of the printing stroke of the bar.

33. In a typewriter, a type bar, a plural type head shiftable thereon, mechanism including a trip for shifting and locking the type head during the first part of the printing stroke of the type bar, and a key for operating the trip.

34. In a typewriter, a type bar, a plural type head movable thereon, an actuator for moving the head during the first part of the printing stroke of the bar, said actuator also serving to positively oppose the movement of the type head to a different printing position when actuated in the manner stated.

35. In a typewriter, a type bar, a type head movably supported thereby, and a combined shifting and locking device carried by the bar to shift the head from its normal position during the printing stroke of the bar and to positively lock the head in said position.

36. The combination with a type bar, of a movable type head carrying a plurality of type, and a locking device carried by the type bar to lock the type head in a position other than normal, said locking device constituting means for shifting the head from one position to another.

37. The combination with a type bar, of a plural type head movably supported thereon and provided with a projection, and a locking device carried by the type bar and engaging said projection to positively lock the head in a position other than normal, said locking device constituting means for shifting the head from one position to another.

38. The combination with a type bar and a plural type head pivoted thereto and having a projecting portion, of a device carried by the type bar separate from the type head and coöperating with the projecting portion to effect the turning of the head, said device serving also as a positive lock for the head in a position other than the normal position of said head.

39. In a typewriter, the combination with a type bar and a type head movably mounted thereon and adapted to be shifted to either of two positions, of a single device mounted on the bar, said device serving to shift the type head to either position and to lock the head in a position other than normal.

40. In a typewriter, a plural type head movable toward and from the printing point and shiftable to present different type in the printing position, and an actuator movable to shift the head during the commencement of the printing stroke and serving to resist the reshifting of the head to its normal position.

41. In a typewriter, a plural type head movable toward and from the printing point and shiftable to present different type in the printing position, an actuator movable to shift the head during the first part of the printing stroke, said actuator positively opposing the reshifting of the head to its normal position during the remainder of the printing stroke, and means coacting with the actuator and assisting the same in opposing the reshifting of the head.

42. In a typewriter, a normally vertical type bar pivoted at its lower end, a type head pivoted at the upper end of the type bar and having a plurality of radially disposed types arranged one above another, the lowermost type being normally disposed in the printing position, and mechanism operating during the first part of the printing stroke of the type bar for shifting the head from its normal position to present another type in the printing position.

43. In a typewriter, a normally vertical type bar pivoted at its lower end, a type head pivoted at the upper end of said bar and having a plurality of radially disposed types arranged one above another, the lowermost type being disposed in the printing position in the normal position of the head, and mechanism carried by the type bar and acting during the early part of the printing stroke thereof to shift the head from its normal position and to prevent reshifting of the head in the opposite direction until the printing stroke is completed.

44. In a typewriter, a swinging type bar movable toward and from the printing point, a type head pivotally mounted on the type bar to shift on a horizontal axis, a plurality of type faces arranged one above another on the type head, an actuator pivoted on the bar and coöperatively related to the head, a trip coacting with the actuator during the first part of the printing stroke to swing the type carrying side of the head toward the axis of the type bar, and an element mounted on the type bar, and coöperating with said actuator to oppose such movement of the shifted head as would serve to represent the displaced type in the printing position.

In testimony that I claim the foregoing as my own, I have hereto affixed my signature in the presence of two witnesses.

ROBERT JOSEPH FISHER.

Witnesses:
J. L. Emerson,
J. D. Williams.